US008942769B2

(12) United States Patent
Ueno et al.

(10) Patent No.: US 8,942,769 B2
(45) Date of Patent: Jan. 27, 2015

(54) MOBILE ELECTRONIC DEVICE (76) Inventors: Yasuhiro Ueno, Yokohama (JP); Shigeki Tanabe, Yokohama (JP)

( * ) Notice: Subject to any disclaimer, the term of this patent is extended or adjusted under 35 U.S.C. 154(b) by 31 days.

(21) Appl. No.: 13/331,124

(22) Filed: Dec. 20, 2011

(65) Prior Publication Data
US 2012/0165077 A1 Jun. 28, 2012

(30) Foreign Application Priority Data
Dec. 24, 2010 (JP) ................................. 2010-288619

(51) Int. Cl.
*H04M 1/00* (2006.01)
*G06F 1/16* (2006.01)
*H04N 9/31* (2006.01)
*H04M 1/02* (2006.01)
*H04W 88/02* (2009.01)

(52) U.S. Cl.
CPC ......... *H04M 1/0272* (2013.01); *G09G 2354/00* (2013.01); *G06F 1/1696* (2013.01); *H04M 1/0214* (2013.01); *H04M 2250/12* (2013.01); *G06G 5/34* (2013.01); *H04N 9/3173* (2013.01); *H04W 88/02* (2013.01)
USPC ..... 455/566; 455/556.1; 455/557; 455/575.1; 345/173; 345/520; 345/1.1; 345/156

(58) Field of Classification Search
USPC ............ 455/557, 566, 575.1, 556.1; 345/173, 345/520, 1.1, 156
See application file for complete search history.

(56) References Cited

U.S. PATENT DOCUMENTS

| | | | | |
|---|---|---|---|---|
| 2008/0074560 | A1* | 3/2008 | Ichieda | 348/739 |
| 2010/0093399 | A1* | 4/2010 | Kim et al. | 455/566 |
| 2010/0099464 | A1* | 4/2010 | Kim | 455/566 |
| 2010/0130259 | A1* | 5/2010 | Lee | 455/566 |
| 2011/0151936 | A1* | 6/2011 | Jang et al. | 455/566 |
| 2013/0021223 | A1* | 1/2013 | Ichieda | 345/2.3 |

FOREIGN PATENT DOCUMENTS

| | | |
|---|---|---|
| JP | 2007096452 A | 4/2007 |
| JP | 2007096542 A | 4/2007 |

* cited by examiner

*Primary Examiner* — Junpeng Chen
(74) *Attorney, Agent, or Firm* — Lowe Hauptman & Ham, LLP (57) ABSTRACT

According to an aspect, a mobile electronic device includes a projector, a display unit, a detector, and a processing unit. The projector projects a first image. The display unit displays a second image related to the first image. The detector detects a variation of an attitude. When the variation of the attitude is detected by the detector, the processing unit applies a variation to the first image in association with the variation of the attitude. Then, the processing unit varies the second image in association with the variation of the first image.

19 Claims, 11 Drawing Sheets

MOBILE ELECTRONIC DEVICE

This application claims priority from. Japanese Application No 2010-288619, filed on Dec. 24, 2010, the content of which is incorporated by reference herein in its entirety.

BACKGROUND

1. Technical Field

The present disclosure relates to mobile electronic device having an image projector for projecting an image.

2. Description of the Related Art

As a conventional device for projecting an image to a wall surface or a screen, a so-called projector is used. A mainstream of the projector is a so-called stationary type device which is supplied with electric power from a commercial power supply and is fixed to a predetermined location to be used. The stationary type projector projects, in its fixed state, an image to a given portion of the wall surface or to the screen.

Recently, on the other hand, a mobile projector compact in size and easy to carry is proposed as the projector. For example, Japanese Patent Application Laid-Open No. 2007-96542 describes a mobile terminal with a projector function that is provided with an upper cabinet, a lower cabinet, and a hinge portion for mutually pivotally connecting, the upper cabinet and the lower cabinet, and is provided with a built-in projector that includes a lens and a light source.

Incidentally, the image projected by a mobile projector has a relatively low resolution. Therefore, when the image is projected by the mobile projector, it is sometimes difficult for a user to identify detailed information such as character in the image, and therefore the user may fail to obtain required information.

For the foregoing reasons, there is a need for a mobile electronic device that allows the user to utilize a projected image and information related to the image.

SUMMARY

According to an aspect, a mobile electronic device includes a projector, a display unit, a detector, and a processing unit. The projector projects a first image. The display unit displays a second image related to the first image. The detector detects a variation of an attitude. When the variation of the attitude is detected by the detector, the processing unit applies a variation to the first image in association with the variation of the attitude. Then, the processing unit varies the second image in association with the variation of the first image.

DETAILED DESCRIPTION

Exemplary embodiments of the present invention will be explained in detail below with reference to the accompanying drawings. It should be noted that the present invention is not limited by the following explanation. In addition, this disclosure encompasses not only the components specifically described in the explanation below, but also those which would be apparent to persons ordinarily skilled in the art, upon reading this disclosure, as being interchangeable with or equivalent to the specifically described components.

In the following description, a mobile phone is used to explain as an example of the mobile electronic device, however, the present invention is not limited to mobile phones. Therefore, the present invention can be applied to any type of devices provided with a touch panel, including but not limited to personal handyphone systems (PHS), personal digital assistants (FDA), portable navigation units, personal computers (including but not limited to tablet computers, netbooks etc.), media players, portable electronic reading devices, and gaming devices.

Figure 1:
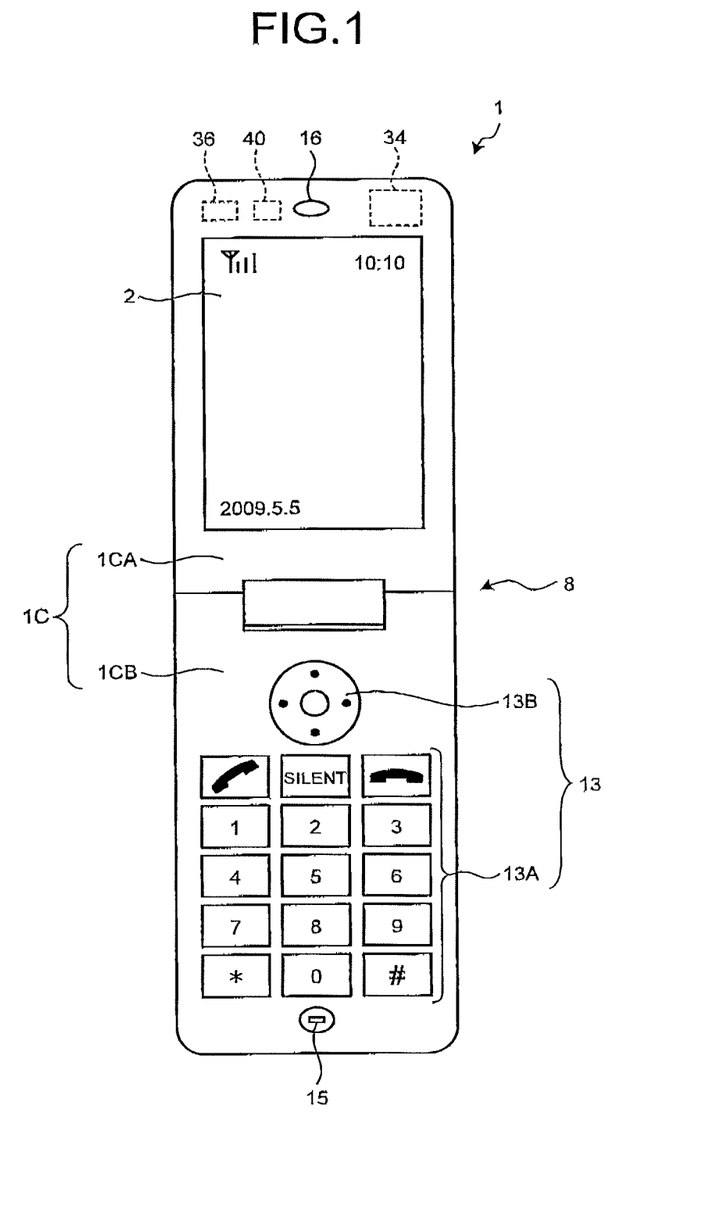
FIG. 1 is a front view illustrating a mobile electronic device according to an embodiment.
Figure 2:
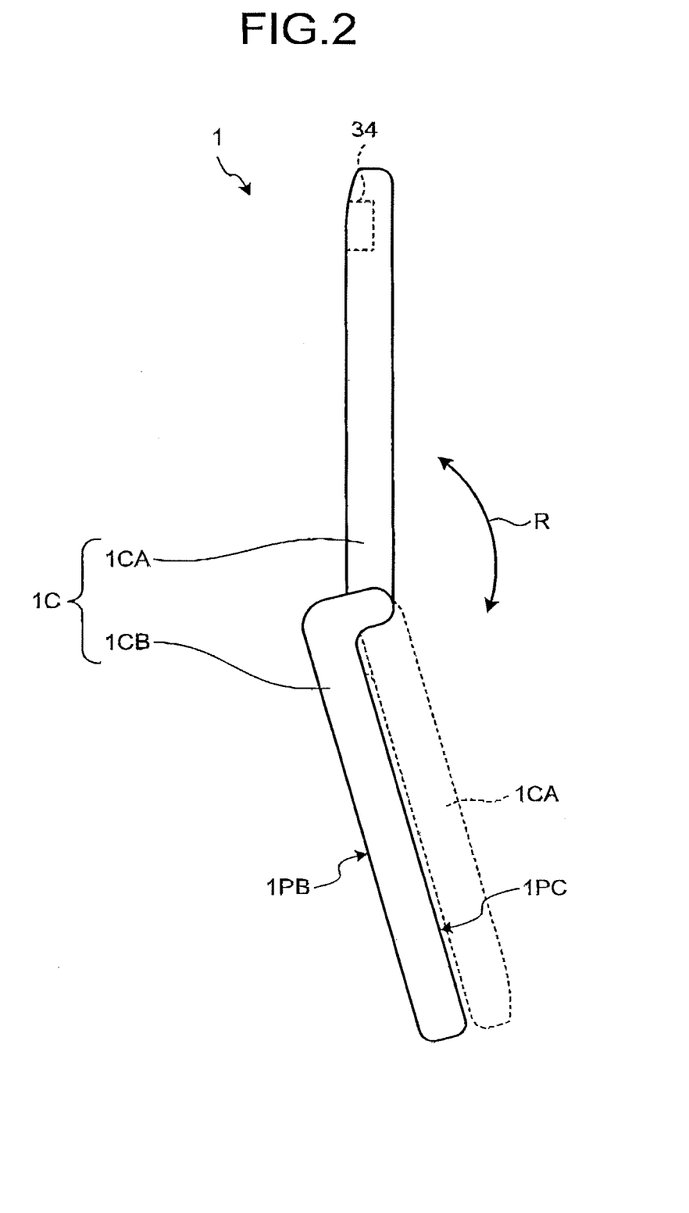
FIG. 2 is a side view of the mobile electronic device illustrated in FIG. 1.

FIG. 1 is a front view illustrating a mobile electronic device according to an embodiment of the present invention, and FIG. 2 is a side view of the mobile electronic device illustrated in FIG. 1. Mobile electronic device 1 illustrated in FIG. 1 and FIG. 2 has a radio communicating function, an output function, a voice acquisition function, and an image capturing function. In the mobile electronic device 1, a housing 1C is constituted of a plurality of housings. Specifically, the housing 1C is constituted of a first housing 1CA and a second housing 1CB so as to be openable and closable. In other words, the mobile electronic device 1 has a foldable housing. The housing of the mobile electronic device 1 is not limited to this structure. For example, the housing of the mobile electronic device 1 may be a sliding type capable of performing a sliding motion from a state that both housings are overlapped on each other, to a state that one of them slides relatively to the other one. Alternatively, the mobile electronic device 1 may be a rotation type capable of rotating one of the housings with an axial line along an overlapping direction as a center, or may be a connection type that connects both housings through a 2-axis hinge.

The first housing 1CA and the second housing 1CB are connected by a hinge mechanism 8, being a connection part. By connecting the first housing 1CA and the second housing 1CB by the hinge mechanism 8, the first housing 1CA and the second housing 1CB are rotated around the hinge mechanism 8, in such a way that the first housing 1CA and the second housing 1CB are separated from each other or approached to each other (in a direction illustrated by arrow R in FIG. 2). The mobile electronic device 1 is opened when the first housing 1CA and the second housing 1CB are rotated in a direction of being separated from each other, and the mobile electronic device 1 is closed and is set in a folded state (a state illustrated by dot line in FIG. 2) when the first housing 1CA and the second housing 1CB are rotated in a direction of being approached to each other.

The first housing 1CA includes a display 2 illustrated in FIG. 1 as a display unit. The display 2 displays a standby image in a state that the mobile electronic device 1 is set in a standby mode of a waiting time for a receipt, and displays a menu screen used for assisting an operation of the mobile electronic device 1. Further, the first housing 1CA includes a receiver 16, being an output part, for outputting voice during speech communication carried out by the mobile electronic device 1.

Provided on a side of the first housing 1CA opposite to the display 2 are a projector 34, being an image projector, a distance sensor 36, being a distance measurement unit for measuring a distance from a light emitting portion (an object lens) of the projector 34 to an image projection target, and a camera 40 for capturing (acquiring) an image of a surface on which the image is projected. With this configuration, an image can be projected to the image projection target by the projector 34, and the image projected by the projector 34 can be automatically focused by measuring a distance between the light emitting portion of the projector 34 and the image projection target by the distance sensor 36. The light emitting portion of the projector 34 and a photographing window of the camera 40 are exposed to outside of the first housing 1CA.

A plurality of operation keys 13A are provided in the second housing 1CB, for inputting telephone numbers of communication partners, or for inputting characters during composing an e-mail. Further, a direction and determination key 13B is provided in the second housing 1CB for easily executing a selection and determination of a menu displayed on the display 2, and scroll, etc., of a screen. The operation key 13A, and the direction and determination key 13B constitute an operation unit 13 of the mobile electronic device 1. A microphone 15, being a voice acquisition unit for receiving the voice during speech communication carried out by the mobile electronic device 1, is provided in the second housing 1CB. The operation unit 13 is provided on an operation surface 1PC of the second housing 1CB. A surface opposite to the operation surface 1PC is a back face 1PB of the mobile electronic device 1.

Figure 3:
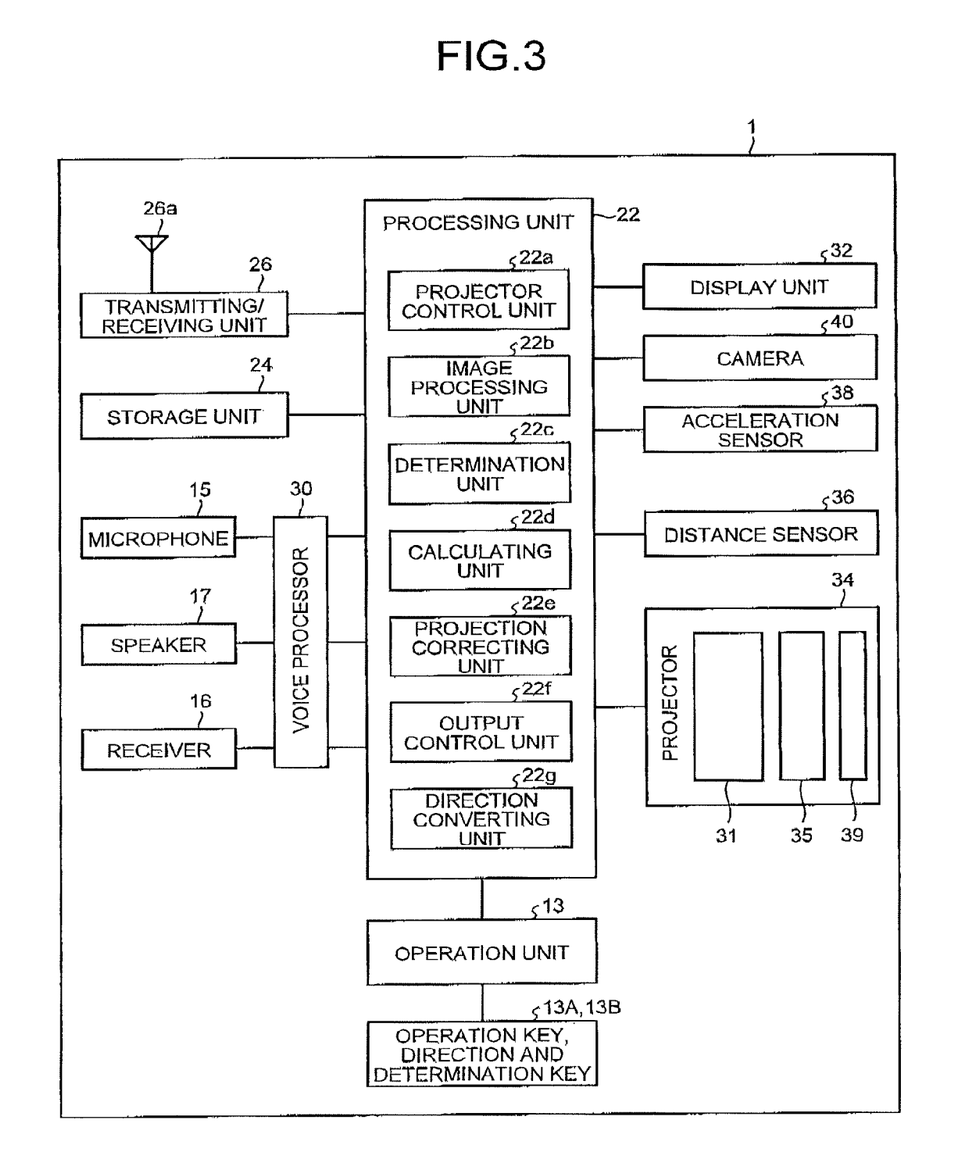
FIG. 3 is a block diagram illustrating the mobile electronic device illustrated in FIG. 1 and FIG. 2.

FIG. 3 is a block diagram illustrating the mobile electronic device illustrated in FIG. 1 and FIG. 2. As illustrated in FIG. 3, the mobile electronic device 1 includes a processing unit 22, a storage unit 24, a transmitting/receiving unit 26, the operation unit 13, a sound processor 30, a display unit 32, the projector 34, the distance sensor 36, an acceleration sensor 38, being a movement detection unit, and the camera 40. The processing unit 22 has a function of integrally controlling an overall operation of the mobile electronic device 1. In other words, the processing unit 22 controls operations of the transmitting/receiving unit 26, the sound processor 30, and the display unit 32, etc., so that each kind of processing of the mobile electronic device 1 is executed by a proper procedure based on the operation of the operation unit 13 and according to a software stored in the storage unit 24 of the mobile electronic device 1.

For example, a voice call carried out through a line exchange network, composing/transmitting/receiving of an e-mail, and browsing of a Web (World Wide Web) site on the Internet, can be given as the aforementioned each kind of processing of the mobile electronic device 1. As the operations of the transmitting/receiving unit 26, the sound processor 30, and the display unit 32, etc., for example transmission/reception of a signal by the transmitting/receiving unit 26, input/output of the sound by the sound processor 30, and display of the image by the display unit 32, can be given.

The processing unit 22 executes processing based on program(s) stored in the storage unit 24 (for example, an operating system program, and an application program, etc.). The processing unit 22 includes micro-processor unit (MFU) for example, and executes each kind of processing of the mobile electronic device 1 based on a procedure instructed by the software. In other words, the processing unit 22 executes processing by sequentially reading command codes from the operating system program and/or the application program, etc., stored in the storage unit 24.

The processing unit 22 has a function of executing a plurality of application programs. For example, there are a plurality of application programs such as an application program for controlling a drive of the projector 34 or the distance sensor 36, an application program for reading each kind of image file (image information) from the storage unit 24 to decode an image, and an application program for displaying the decoded image on the display unit 32 or projecting it on the projector 34.

In the present embodiment, the processing unit 22 includes a projector processing unit 22a, an image processing unit 22b, a determination unit 22c, a calculating unit 22d, a projection correcting unit 22e, a output processing unit 22f, and a direction converting unit 22g.

The projector processing unit 22a controls the projector 34 to project an image to an image projection target. The image processing unit 22b decodes data stored in the storage unit 24 and data received by the transmitting/receiving unit 26, and generates an image projected by the projector 34 and an image displayed on the display unit 32. The image processing unit 22b generates an image displayed or projected as a screen for providing information to a user or receiving input of information from the user. The image processing unit 22b applies processing such as expanding, reducing, and deforming to the image.

The determination unit 22c determines whether or not there is a change of conditions having an influence on the projection of an image by the projector processing unit 22a. A variation of an attitude (direction) of the mobile electronic device 1 and a variation of a distance from the light emitting portion to the image projection target, for example, can be given as the condition having the influence on the projection of the image by the projector processing unit 22a. The calculating unit 22d calculates the attitude and the position of the mobile electronic device 1 based on a detection result of the distance sensor 36 and the acceleration sensor 38, etc.

The projection correcting unit 22e performs correction processing so that a fixed size of the image is projected at a specific position on the image projection target. Specifically, the projection correcting unit 22e maintains the position and the size of the projected image to a fixed size and a specific position, by changing a control of the projector 34 controlled by the projector processing unit 22a, and/or by changing an image processing processed by the image processing unit 22b.

The output processing unit 22f controls the projector 34 to project a first image, and controls the display unit 32 to display a second image, which is related to the first image. Moreover, the output processing unit 22f controls a range and an angle of a projection object, being an object projected as the first image, to be varied in association with a variation of the attitude and the position of the mobile electronic device 1 calculated by the calculating unit 22d, and also controls the content of the second image to be varied in association with the variation of the first image.

The direction converting unit 22g converts a variation amount of an attitude of the mobile electronic device 1, to a variation amount of a range and an angle of an object projected as the first image. For example, the direction converting unit 22g converts a variation of the attitude of −10 degree to +10 degree of the mobile electronic device 1, to a variation of an angle of −180 degree to +180 degree of the object projected as the first image. By such a converting process, the angle of the object projected as the first image can be varied by 360 degrees only by varying the attitude of the mobile electronic device 1 by ±10 degrees.

Each of the functions of the projector processing unit 22a, the image processing unit 22b, the determination unit 22c, the calculating unit 22d, the projection correcting unit 22e, the output processing unit 22f, and the direction converting unit 22g is implemented by hardware resources including the processing unit 22 and the storage unit 24, that execute a task allocated by a processing unit of the processing unit 22. The task is expressed by a processing unit of overall processing performed by the application software, or the processing unit of the processing performed by the same application software, which is the processing unit that can't be executed simultaneously.

The storage unit 24 stores software and data utilized for the processing performed by the processing unit 22, and as described above, stores the task for operating the application program of controlling the drive of the projector 34 and the distance sensor 36, and the task for operating the image processing program. In addition to such tasks, the storage unit 24 also stores communicated or downloaded voice data, or software used by the processing unit 22 for controlling the storage unit 24, an address book for managing telephone numbers and mail addresses of communication partners, sound files such as outgoing sound and incoming sound, temporary data used in the processing step of the software, and etc.

The computer program and temporary data used in the processing step of the software are temporarily stored in a work area allocated to the storage unit 24 by the processing unit 22. The storage unit 24 includes one or more non-transitory storage medium, for example, a nonvolatile memory (such as ROM, EPROM, flash card etc.) and/or a storage device (such as magnetic storage device, optical storage device, solid-state storage device etc.).

The transmitting/receiving unit 26 establishes a wireless signal path using a code-division multiple access (CDMA) system, or any other wireless communication protocols, with a base station via a channel allocated by the base station, and performs telephone communication and information communication with the base station. Any other wired or wireless communication or network interfaces, e.g., LAN, Bluetooth, Wi-Fi, NFC (Near Field Communication) may also be included in lieu of or in addition to the transmitting/receiving unit 26. The operation unit 13 includes an operation key 13A to which each kind of functions is allocated, such as a power source key, a call key, numeral keys, character keys, a direction key, a decision key, and outgoing keys, and a direction and decision key 13B. When these keys are inputted by the operation of the user, a signal corresponding to that operation is generated. The generated signal is inputted into the processing unit 22 as a command from the user.

The sound processor 30 executes processing to a sound signal inputted into the microphone 15, and a sound signal outputted from a receiver 16 and a speaker 17. Specifically, the sound processor 30 amplifies the sound inputted from the microphone 15, and applies AD conversion (Analog to Digital conversion) processing thereto, and thereafter further applies signal processing thereto such as encoding, thus converting it to digital sound data and outputting it to the processing unit 22. Further, the sound processor 30 applies decoding processing to the sound data sent from the processing unit 22, and applies DA conversion (Digital to Analog conversion) processing thereto, and applies processing such as amplifying processing thereto, thereby converging it to an analog sound signal and outputting it to the receiver 16 and the speaker 17. The speaker 17 is disposed in the housing 1C of the mobile electronic device 1, so that the ring tone and the transmission sound of mails are outputted.

The acceleration sensor 38 detects the direction and magnitude of the acceleration applied to the mobile electronic device 1. A detection result of the acceleration sensor 38 is used for determining an attitude variation and presence/absence of movement of the mobile electronic device 1, or is used for calculating an amount of the attitude variation and a moving distance. In order to determine the presence/absence of the attitude variation of the mobile electronic device 1, or calculate the amount of the attitude variation of the mobile electronic device 1, a direction sensor may be provided to the mobile electronic device 1.

The display unit 32 has the aforementioned display 2, so that a video corresponding to picture data and an image corresponding to image data supplied from the processing unit 22 are displayed on the display 2. The display 2 includes a liquid crystal display (LCD) or an organic electro-luminescence panel (organic EL), etc., for example. The display unit 32 may include a sub-display, in addition to the display 2.

The projector 34 includes a light source, and an optical system for switching whether or not the light emitted from the light source is projected based on the image data. In present embodiment, the projector 34 includes a visible light irradiation device (visible light irradiation unit) 31, being the light source, a drawing device 35, being the optical system, and a focus adjustment device 39. The visible light irradiation device 31 carries out irradiation of a laser beam, being the visible light. The light in a visible light region is a light whose short wavelength side is from 360 nm to 400 nm or more, and whose long wavelength side is from 760 nm to 830 nm or less. In present embodiment, the visible light irradiation device 31 carries out irradiation of light of three colors of R(Red), G(Green), and B(Blue).

The drawing device 35 synthesizes the lights of three colors emitted from the visible light irradiation device 31, and irradiates the image projection target with the synthesized light. The drawing device 35 includes a switching element for switching whether or not the light emitted from the light source is passed through, and a mirror for performing a raster scan of the light passed through the switching element. The drawing device 35 varies an angle of the laser beam emitted from the visible light irradiation device 31 by the mirror to scan the image projection target with the laser beam, so that the image is projected to the image projection target.

For example, a Micro Electro Mechanical System (MEMS) mirror is used as the mirror. The MEMS mirror drives the mirror by a piezoelectric element to scan the image projection target with the light emitted from the visible light irradiation device 31, thereby generating a visible image or an invisible image. In this case, the visible image and the invisible image can be projected to the image projection target by scanning an overall surface of the image projection target with the light emitted from the light source. Thus, the projector 34 functions as a scan-type projector. The configuration of the projector 34 is not limited to that using the aforementioned laser as the light source. For example, the projector 34 may include a halogen light, a LED light source, or a LD light source as the light source, and a LCD or Digital Micro-mirror Device (DMD) as the optical system.

The focus adjustment device 39 has a function (a focus adjustment function) of forming the visible image on the image projection target, the visible image being projected from the drawing device 35, based on a command from the projector processing unit 22a, The focus adjustment device 39 has a focus adjustment mechanism for example, which is formed of a movable lens, etc., and realizes the focus adjustment function by moving the lens. The focus adjustment device 39 may realize the focus adjustment function by applying an image processing by the image processing unit 22b, to the image data projected by the projector 34. The focus adjustment device 39 may realize the focus adjustment function by moving the lens to adjust the focus and by applying the image processing to the image data. The distance sensor 36 measures a distance from the light emitting portion of the projector 34 to the image projection target. Instead of the distance sensor 36, the focus adjustment device 39, that has a function for adjusting a focus of an image projected by the projector 34, may be used for measuring the distance from the light emitting portion of the projector 34 to the image projection target.

Figure 4:
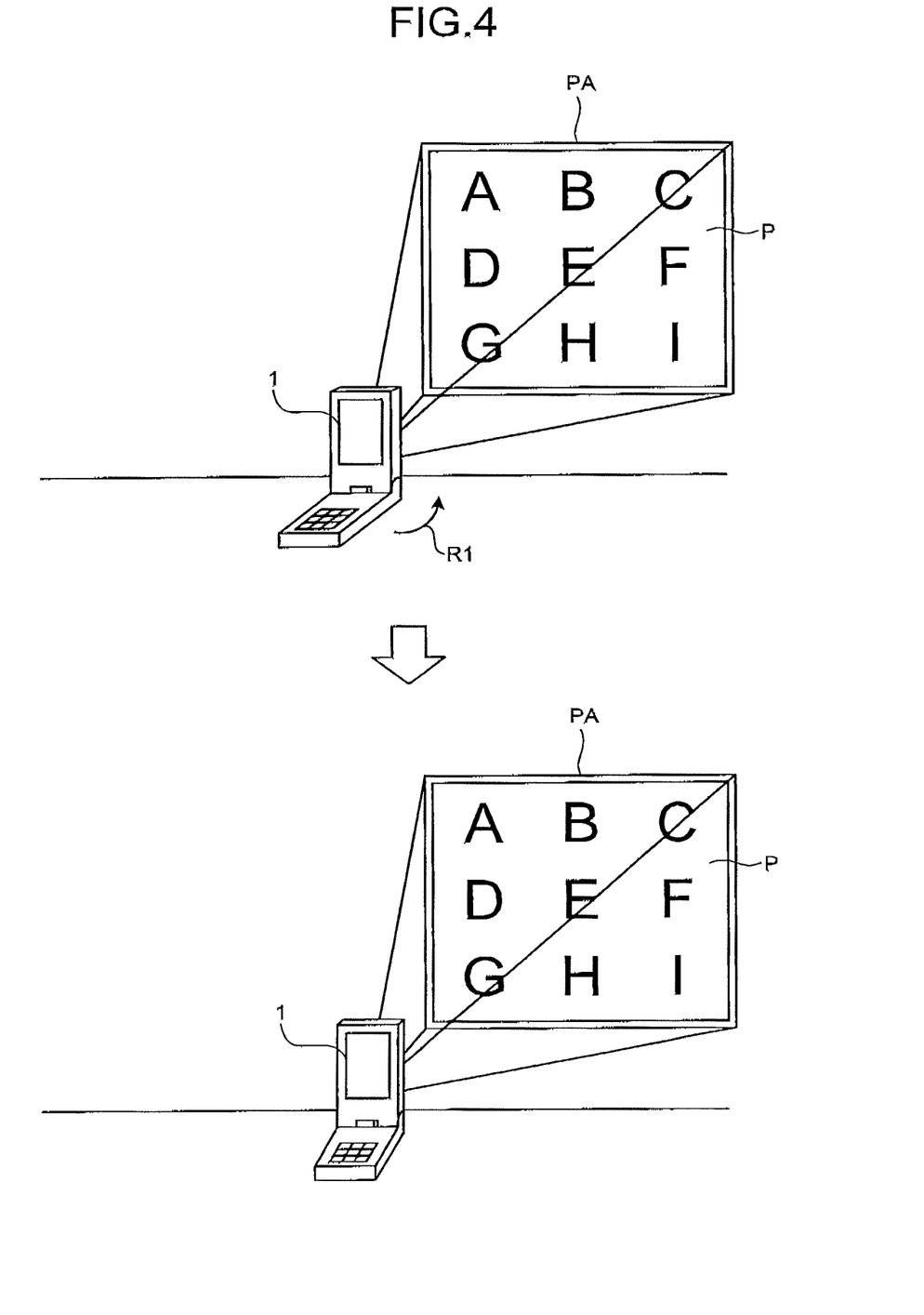
FIG. 4 is an explanatory view illustrating a state that the image is projected by a projector of the mobile electronic device illustrated in FIG. 1.

FIG. 4 is an explanatory view illustrating a state that the image is projected from the projector of the mobile electronic device illustrated in FIG. 1. As described above, the projector 34 functions as an image projector for projecting an image, and an image projection surface of the projector 34 is exposed to outside of the housing 1C of the mobile electronicdevice 1. The mobile electronic device 1 causes an image to be projected from the projector 34 so that an image P is projected in a predetermined area (projection area) PA on the image projection target (for example, a wall face or a screen, etc.) opposed to the image projection surface of the projector 34, as illustrated in FIG. 4. The operation of the projector 34 is controlled by the processing unit 22, and various pictures sent from the processing unit 22, for example, a moving picture, a presentation document, and etc., are projected in the projection area PA.

The camera 40 is provided near the light emitting portion of the projector 34 as described above, and functions as an image capturing unit for acquiring an image of an area including the projection area. In other words, the camera 40 acquires the image in a direction in which the light is emitted by the projector 34. The camera 40 is configured to photograph an image at a wider field angle than a projection field angle at which the projector 34 projects an image, thus making it possible to photograph an image in a wider area than the projection area in which an image is projected by the projector 34.

Even if an attitude and/or a position of the mobile electronic device 1 are varied within an allowable range, the processing unit 22 controls the projector 34, etc., based on an image photographed by the camera 40, etc., so that the image F is projected at a fixed size in the projection area PA as described above. For example, when the mobile electronic device 1 is rotated by an angle R1, the processing unit 22 causes a projection direction of the projector 34 changed such that the image P is projected in the projection area PA.

Figure 5:
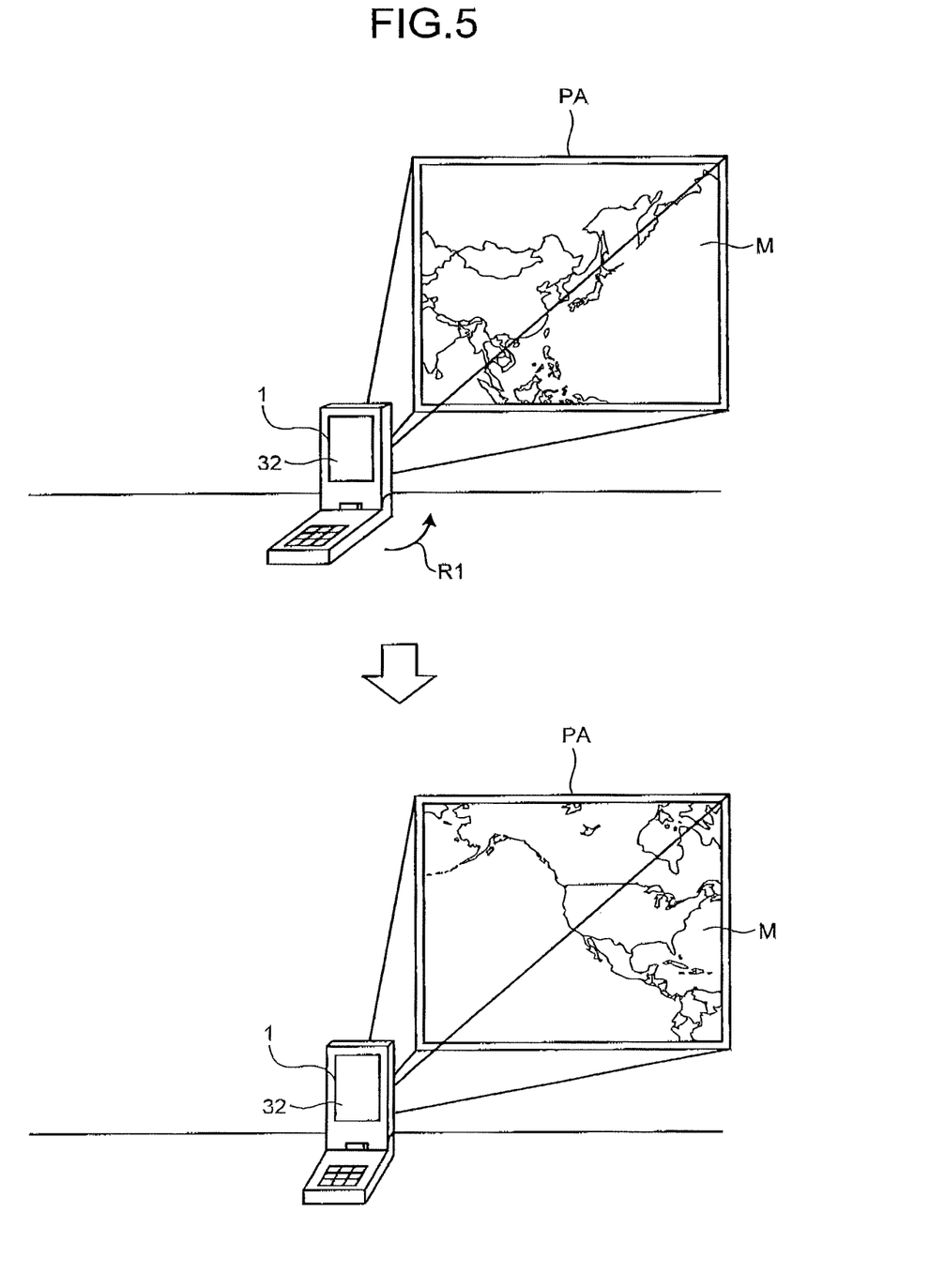
FIG. 5 is a view illustrating an example of changing the content of the projected image in association with a variation of an attitude.

Further, the mobile electronic device 1 changes the content of an image projected in the projection area PA, in association with the variation of the attitude of the mobile electronic device 1. FIG. 5 is a view illustrating an example of changing the content of the projected image in association with the variation of the attitude of the mobile electronic device 1. As illustrated in FIG. 5, it is assumed that a map in the neighborhood of Japan is projected in the projection area PA initially, out of a world map M.

At this time, when the mobile electronic device 1 is rotated counterclockwise by angle R1 by a user, the mobile electronic device 1 controls a projected portion to be scrolled in a right direction, which is a portion projected in the projection area PA in the world map, in association with a variation direction and a variation amount of an attitude of the mobile electronic device 1. As a result, for example a map in the neighborhood of USA in the world map M is projected in the projection area PA.

Further, when a projected content is changed by the projector 34, the mobile electronic device 1 changes the content displayed on the display unit 32 linked with the variation of the content projected by the projector 34. For example, when the map in the neighborhood of Japan is projected by the projector 34, the mobile electronic device 1 displays the information regarding Japan on the display unit 32. Then, when the map in the neighborhood of USA is projected by the projector 34, the mobile electronic device 1 displays the information regarding USA on the display unit 32.

Thus, the mobile electronic device 1 controls the projector 34 to vary a range of an image to be projected by the projector 34, in association with a variation direction and a variation amount of an attitude of the mobile electronic device 1. Further, the mobile electronic device 1 controls the display unit 32 to change the content displayed on the display unit 32, in association with a variation of a content projected by the projector 34. Under such a control, the projection content and the display content of the mobile electronic device 1 can be varied by the intuitive operation of varying the attitude of the mobile electronic device 1 by the user. This contributes to improving a convenience of the user.

Figure 6:
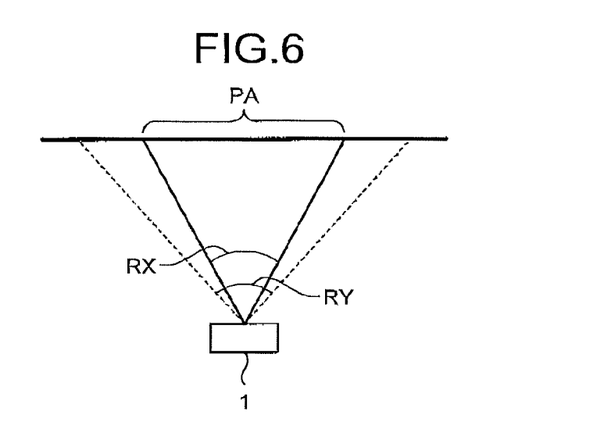
FIG. 6 is a view illustrating an example of a projectable range of the mobile electronic device.
Figure 7:
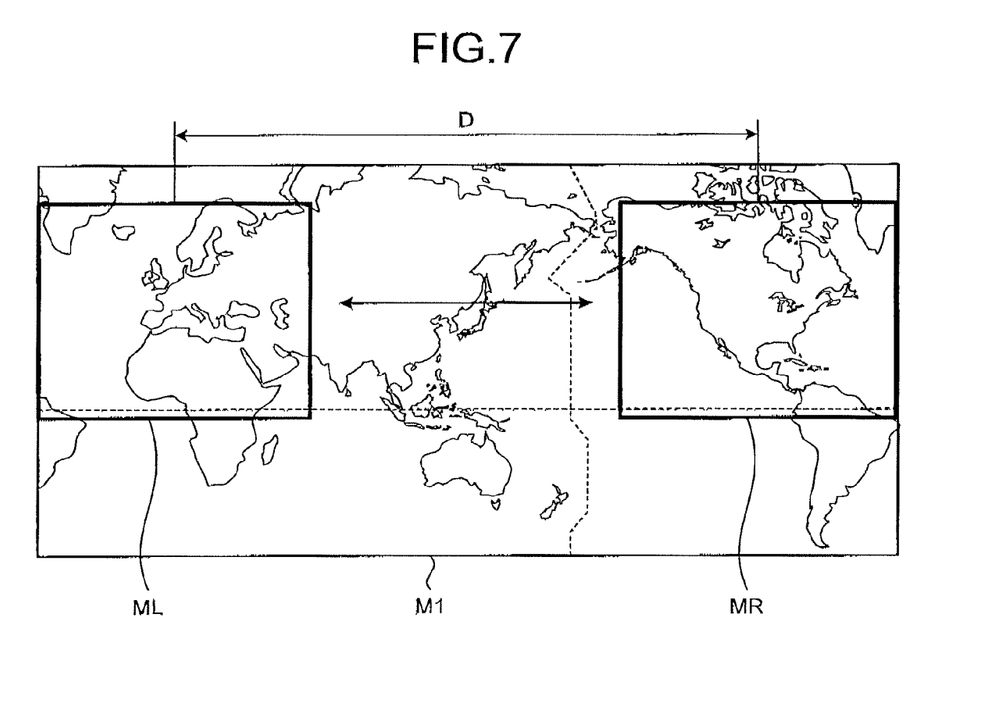
FIG. 7 is a view illustrating an example of a scroll range of a projection target.

The correspondence between the variation amount of the attitude of the mobile electronic device 1 and the variation amount of the content projected by the projector 34 will be further specifically described, with reference to FIG. 6 and FIG. 7. FIG. 6 is a view illustrating an example of a projectable range of the mobile electronic device 1. FIG. 7 is a view illustrating an example of a scroll range of the projection target.

An angle RY represents a horizontal angle of a maximum projection range in which the mobile electronic device 1 can project an image, and an angle RX represents an actual projection angle for projecting an image to the projection area PR. As illustrated in FIG. 6, the angle RY is wider than the angle RX. Therefore, even if the attitude of the mobile electronic device 1 is varied in a horizontal direction within a range of a difference between the angle RY and the angle RX, the mobile electronic device 1 can project the image in the projection area PA. Hereinafter, the difference between the angle RY and the angle RX, namely, a range that allows the image of the same size to be projected in the projection area Ph even if there is the attitude variation in the mobile electronic device 1, may be called a projectable range.

FIG. 7 illustrates an example of scrolling a projection range of the world map M1 horizontally from a partial map M1, to a partial map MR within a range of distance D. In order to scroll the projection range as illustrated in FIG. 7, the projectable range is associated with a scroll distance. For example, the projectable range and the scroll distance can be associated with each other by a following formula for determining a projection range of the world map M1 projected in the projection area PA. The formula is given by $$d = D \times r/(RY-RX),$$

where d indicates a scroll distance representing an amount of scrolling operation for change the projection range to be projected in the projection area PA, r indicates an angle representing the amount of the attitude variation of the mobile electronic device 1, and RY−RX indicates the projectable range, namely, the range of the attitude variation that allows a projection image of a fixed size to be projected in the projection area PA by the mobile electronic device 1.

The correspondence between a direction in which the attitude of the mobile electronic device 1 is varied and a direction in which a portion of the world map M1 projected in the projection area PA is scrolled may be arbitrarily set. For example, the projected portion may be scrolled in a right direction when the mobile electronic device 1 is rotated clockwise, and the projected portion may be scrolled in a left direction when the mobile electronic device 1 is rotated counterclockwise. Alternatively, the projected portion may be scrolled in the left direction when the mobile electronic device 1 is rotated clockwise, and the projected portion may be scrolled in the right direction when the mobile electronic device 1 is rotated counterclockwise.

In the above description, explanation is given for a case that the horizontal variation of the attitude of the mobile electronic device 1 is associated with the horizontal scroll of the projection range. In the same way, a vertical variation of the attitude of the mobile electronic device 1 may be associated with a vertical scroll of the projection range. Further, by associating the variation of the attitude of the mobile electronic device 1 with the scroll of the projection range both in the horizontal direction and the vertical direction, the projection range may be obliquely scrolled.

In the above description, explanation is given for a case that the variation of the attitude of the mobile electronic device 1 is associated with the scroll of the projection range. However, the variation of the attitude of the mobile electronic device 1 may be associated with a rotation. As a system of associating the variation of the attitude with the rotation, a system of rotating an object included in the projection image in association with the variation of the attitude, a system of rotating a viewpoint of the projection image in association with the variation of the attitude, and the like, can be considered. In the system of associating the variation of the attitude of the mobile electronic device 1 with the rotation, the object included in the projection image and the viewpoint of the projection image may be varied by 360 degrees by varying the attitude of the mobile electronic device 1 within a projectable range.

In the system of rotating the object included in the projection image in association with the variation of the attitude, for example, the Earth included in the projection image is rotated in association with the variation of the attitude of the mobile electronic device 1, so that the Earth can be projected in a desired direction. In the system of rotating the viewpoint of the projection image in association with the variation of the attitude, for example, the direction of the viewpoint, of an image of a night sky where constellations are spread, can be varied in association with the variation of the attitude of the mobile electronic device 1, so that a desired constellation can be projected.

Figure 8:
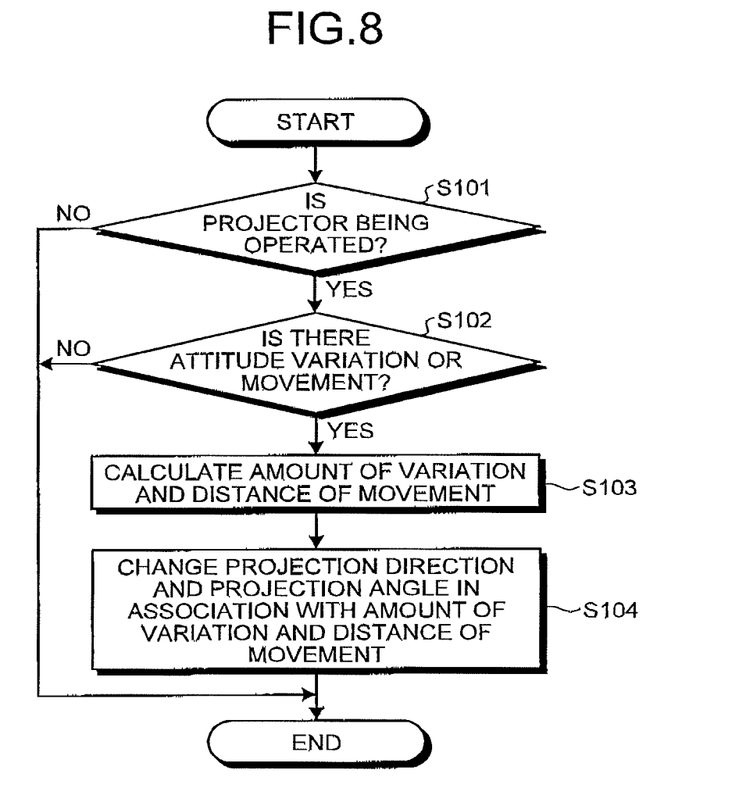
FIG. 8 is a flowchart illustrating an example of a projecting operation of the mobile electronic device.

Next, explanation will be given for an image projecting operation of the projector of the mobile electronic device, with reference to FIG. 8. FIG. 8 is a flowchart illustrating an example of the projecting operation of the mobile electronic device. First, the processing unit 22 of the mobile electronic device 1 determines whether or not the projector 34 mounted on the mobile electronic device 1 is in use, by the determination unit 22, at Step S101. When it is determined that the projector is not being operated at Step S101, (No), that is, when it is determined by the determination unit 22 that the projector 34 is not in use, the processing unit 22 ends its control for the projecting operation.

When it is determined that the projector is being operated at Step S101 (Yes), that is, when it is determined by determination unit 22c determines that the projector 34 is in use, the processing unit 22 determines whether there is an attitude variation or movement, at Step S102. In other words, the processing unit 22 determines whether the projector 34 mounted on the mobile electronic device 1 has moved, that is, whether or not there is the attitude variation or movement of the projector 34 (mobile electronic device 1), by determination unit 22c. The determination unit 22c can determine whether or not there is the attitude variation or movement of the projector 34 based on an image photographed by the camera 40 and a focal distance calculated by an automatic focusing function. Alternatively, the determination unit 22c can determine whether or not there is the attitude variation or movement of the projector 34 by using the detection result of the distance sensor 36 and the acceleration sensor 38. It should be noted that, in present embodiment, a relative movement between the projection area and the projector 34 is also determined to be the movement of the projector 34. That is, the determination unit 22c determines that the projector 34 is moved when a distance between the projection area and the projector 34 is varied. The determination unit 22c may determine that the projector 34 is moved when an advancing movement or a retreating movement in a projection direction (to/from the projection area along the projection direction) is detected. When it is determined that there is no variation or movement of the projector 34 at Step S102 (No), that is, when it is determined that the projector 34 has not moved, by the determination unit 22c, the processing unit 22 ends its control for the projecting operation.

When it is determined that there is the attitude variation or movement of the projector 34 at Step S102 (Yes), that is, when it is determined that the projector 34 has moved, by the determination unit 22c, the processing unit 22 calculates an amount of the attitude variation and an moving distance based on the movement of the projector 34 (mobile electronic device 1), by the calculating unit 22d to, at Step S103. In other words, the processing unit 22 calculates a variation of an angle formed by the projector 34 and the projection area in which the image is projected, and a variation of the distance therebetween. Specifically, the processing unit 22 detects an attitude of the projector 34 based on the detection result of the camera 40 or the acceleration sensor 38, and compares the detected attitude with a standard attitude or a previous attitude, to thereby calculate the amount of the attitude variation. Further, the processing unit 22 detects a distance between the projection area and the projector 34 based on the detection result of the camera 40 or the distance sensor 36 and the acceleration sensor 38, and compares the detected distance with a standard distance or a previous distance, to thereby calculate the moving distance and a moving direction.

When the amount of the attitude variation and the moving distance are calculated at Step S103, the processing unit 22 changes a projection direction and a projection angle of the projector 34 in association with the amount of the attitude variation and the moving distance obtained at Step S103, by the projection correcting unit 22e, so that the image of the same size can be projected at the same position as the position before variation of the attitude or movement of the projector 34, at Step 104. When the processing of step S104 is ended, the processing unit 22 ends its control for the projecting operation. The processing unit 22 repeats the aforementioned processing during projecting the image by the projector 34.

The variation of the projection direction of the projector 34 (adjustment of the position of the projection image) may be realized by changing a direction of the projector 34 itself by forming the projector 34 in a movable type, or may be realized by changing a scan range (rotation range) of the mirror that forms the drawing device 35, or may be realized by disposing a movable type lens in a light emitting portion of the projector 34 and changing the direction of the lens. The variation of the projection direction may be realized by generating a projection image by synthesizing an image, being the projection target, on a transparent layer by the image processing unit 22b, and changing the position of the image, being the projection target, on the transparent layer. The variation of the projection direction may be realized by combination of these systems.

The variation of the projection angle of the projector (adjustment of the size of the projection image) may be realized by changing a swing angle (rotation angle) of the mirror that forms the drawing device 35, or may be realized by disposing the movable type lens in the light emitting portion of the projector 34 and changing the distance between the lens and the light source. The variation of the projection angle may be realized by generating a projection image by synthesizing an image, being the projection target, on the transparent layer by the image processing unit 22b, and changing the size of the image, being the projection target, on the transparent layer. The variation of the projection angle may be realized by combination of these systems.

Figure 9:
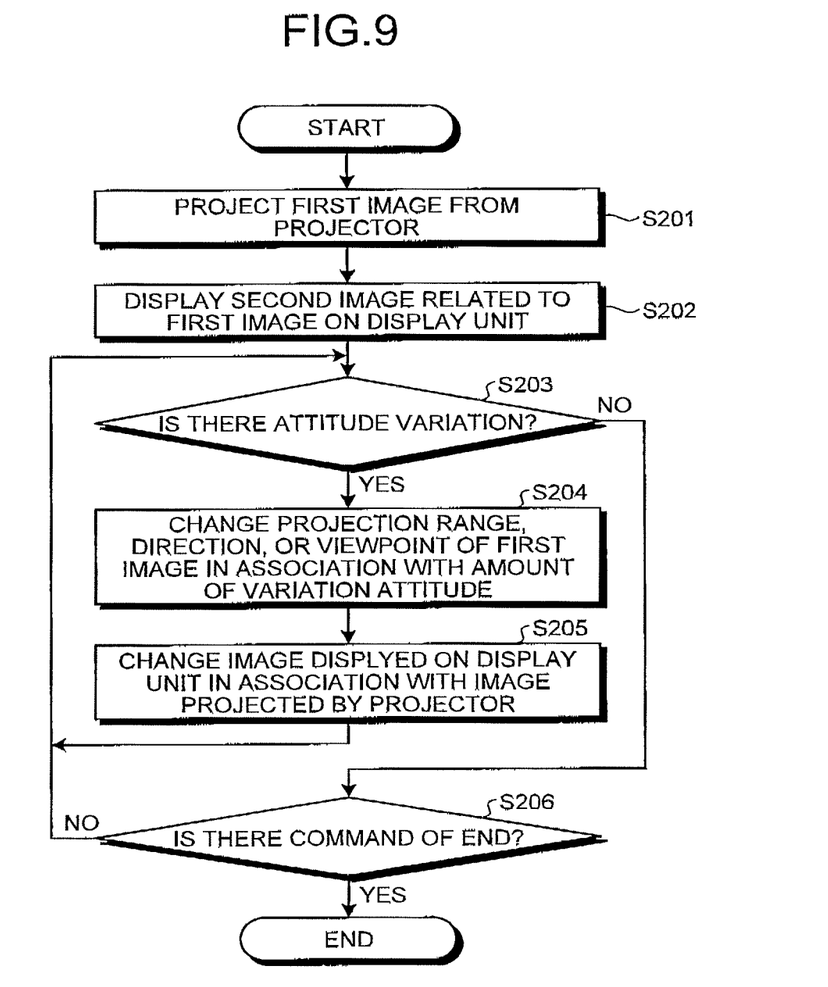
FIG. 9 is a flowchart illustrating an example of an image output operation of the mobile electronic device.

Next, explanation will be given for an operation of the mobile electronic device for outputting an image in association with another image, with reference to FIG. 9. FIG. 9 is a flowchart illustrating an example of an image output operation of the mobile electronic device. The projecting operation illustrated in FIG. 9 is repeatedly executed in parallel with the image projecting operation illustrated in FIG. 8. First, the output processing unit 22f of the processing unit 22 controls the projector 34 to project the first image, at Step S201. Further, the output processing unit 22f controls the display unit 32 to display the second image, which is related to the first image, at Step S202.

Then, the output processing unit 22f determines whether the variation of the attitude of the mobile electronic device 1 is detected, at Step S203. When it is determined that the variation of the attitude of the mobile electronic device 1 is detected at Step S203 (Yes), the output processing unit 22f changes a range of projected portion of the first image, a direction of an object included in the first image, or a viewpoint of the first image, in association with the variation direction and the amount of the attitude variation of the mobile electronic device 1, at Step S204.

The variation direction and the variation amount of the display range, etc., are calculated by the direction converting unit 22g. The data projected as the first image after variation may be previously stored in the mobile electronic device 1, or may be dynamically generated by arithmetic operation of the mobile electronic device 1, or may be acquired from other device by communication carried out by the mobile electronic device 1.

Subsequently, the output processing unit 22f updates the display content of the second image, in association with the display content of the first image after variation, so that the first image and the second image are associated with each other, at Step S205. Thereafter, the output processing unit 22f executes the determination of step S203 again.

When it is determined that the variation of the attitude of the mobile electronic device 1 is not detected at Step S203 (No), the output processing unit 22f determines whether an end command is received by the operation unit 13, etc., at Step S206. When it is determined that the end command is received at Step S206 (Yes), the output processing unit 22f ends its control. Meanwhile, when it is determined that the end command is not received at Step S206 (No), the output processing unit 22f executes the determination of step S203 again.

Figure 10:
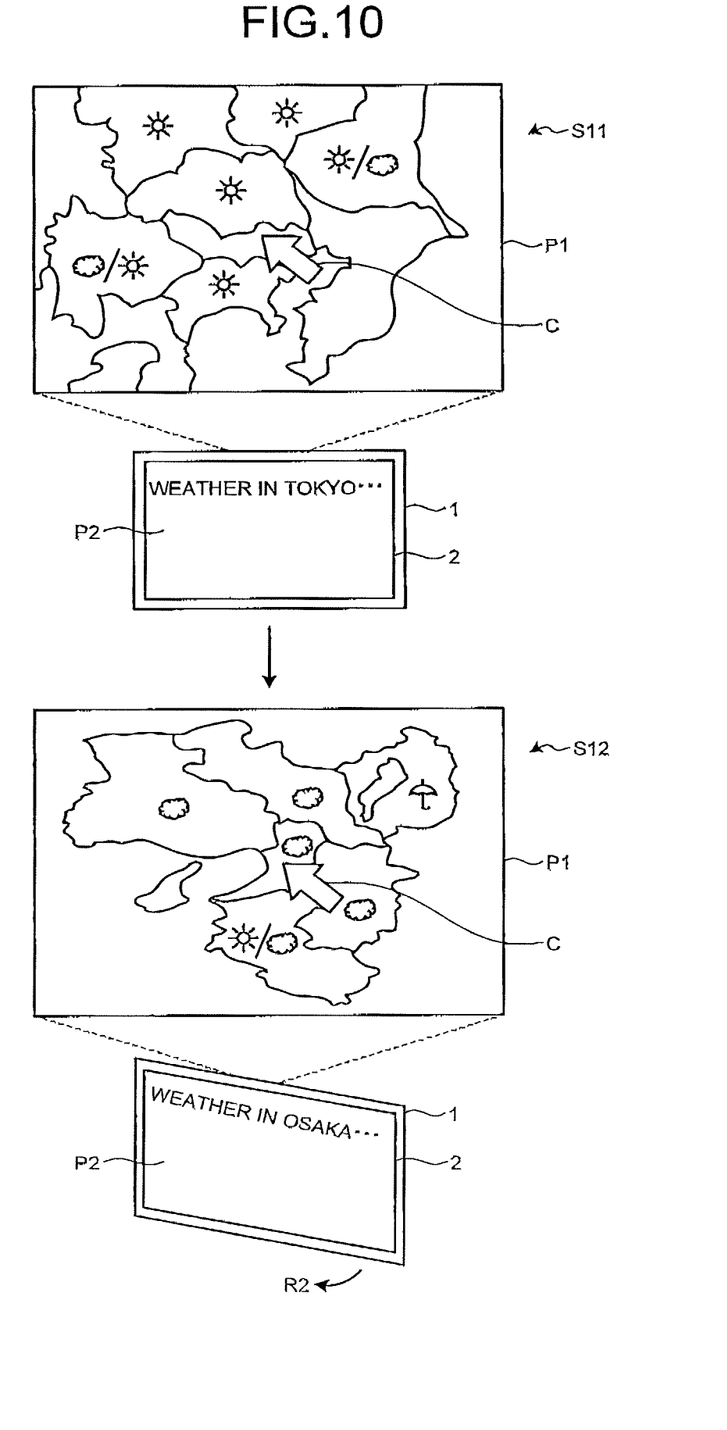
FIG. 10 is an explanatory view for explaining an operation of the mobile electronic device.
Figure 11:
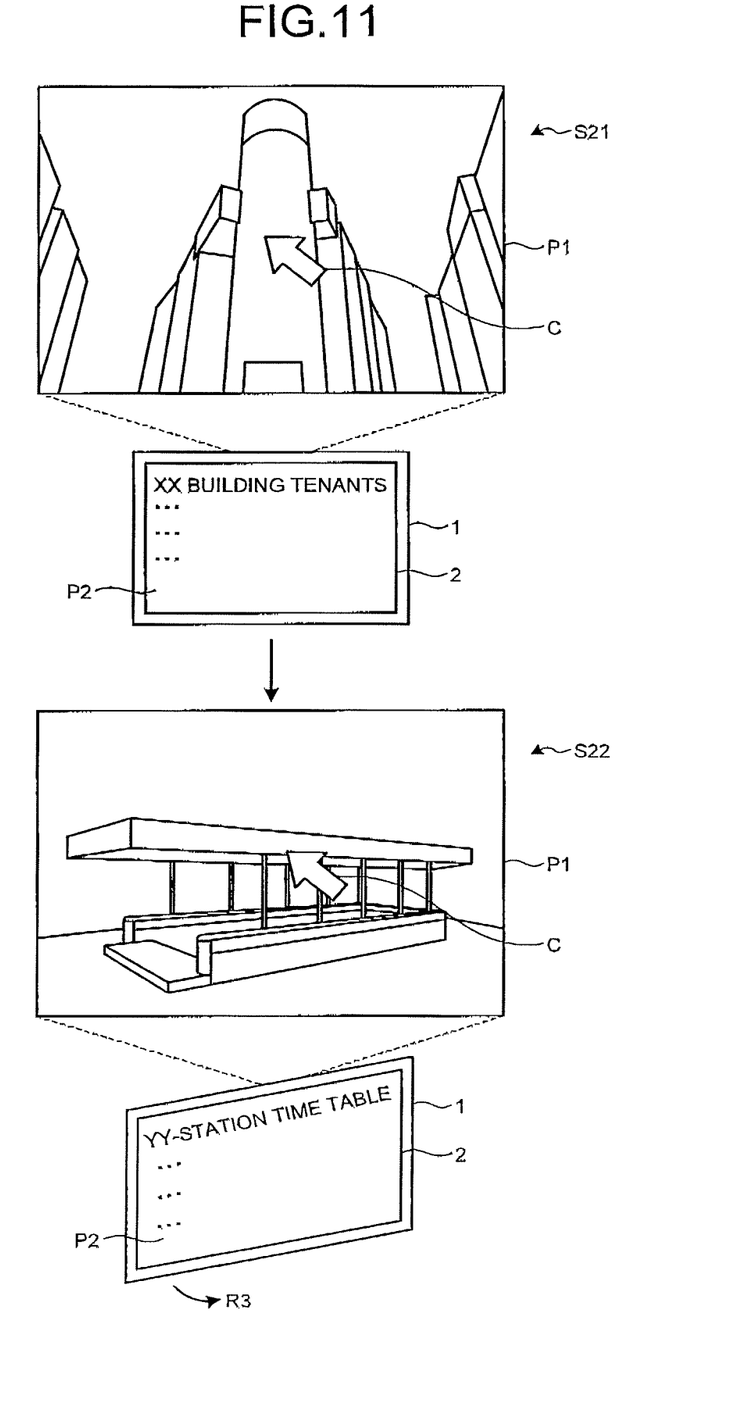
FIG. 11 is an explanatory view for explaining another operation of the mobile electronic device.
Figure 12:
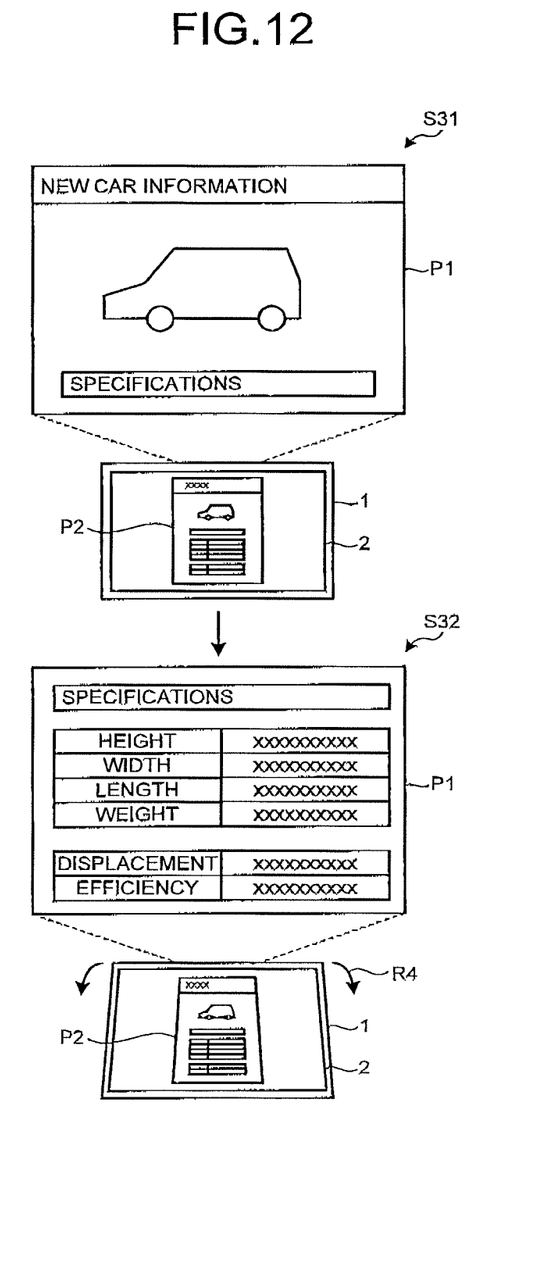
FIG. 12 is an explanatory view for explaining another operation of the mobile electronic device.

Next, the further detailed explanation of the mobile electronic device 1 will be described, using specific examples. FIGS. 10 to 12 are respectively explanatory views for explaining the operation of the mobile electronic device. In FIGS. 10 to 12 the shape of the mobile electronic device 1 is illustrated schematically.

At Step S11 illustrated in FIG. 10, the mobile electronic device 1 controls the projector 34 to project a weather map of the Kanto region of Japan, as a first image P1. A cursor C is superimposed on the first image 21. Further, the mobile electronic device 1 controls the display unit 32 to display a detailed screen of a weather forecast of Tokyo indicated by the cursor C in the first image 21, as a second image P2 related to the first image P1.

Here, it is assumed that the user rotates the mobile electronic device 1 clockwise by an angle R2. When the variation of the attitude of its own device is detected, the mobile electronic device 1 controls the range projected as the first image F1 to be scrolled in association with the direction and the amount of the detected attitude variation, as at Step S12. As a result, at Step S12, the weather map of the Kansai region is projected as the first image P1, and the cursor C indicates Osaka. Accordingly, the mobile electronic device 1 controls the display unit 32 to display a detailed screen of the weather forecast of Osaka indicated by the cursor C as the second image P2.

In this way, while projecting the weather map in a wide range, the mobile electronic device 1 displays the detailed screen of the weather forecast of a specific region in the weather map. This allows the user to watch detailed information regarding the specific region on the display 2 with high resolution while browsing an expanded weather map. Further, the mobile electronic device 1 scrolls the weather map and changes the content of the detailed screen of the weather forecast in association with the variation direction and the variation amount of the attitude of the mobile electronic device 1. This allows the user to change the weather map and the detailed screen to those of a desired region by an intuitive operation of changing the attitude of the mobile electronic device 1.

The mobile electronic device 1 may detect a variation of its position and move a position of the cursor C in association with the variation of its position, when the position of the mobile electronic device 1 is changed by the user. In this case, for example, the position of the cursor C is moved to the right when the position of the mobile electronic device 1 is moved to the right by the user.

Subsequently, FIG. 11 will be explained. FIG. 10 illustrates an example of associating the variation of the attitude of the mobile electronic device 1 with the scroll of the projecting portion. Meanwhile, FIG. 11 illustrates an example of associating the variation of the attitude of the mobile electronic device 1 with the rotation.

At Step S21 illustrated in FIG. 11, the mobile electronic device 1 controls the projector 34 to project an image of a district viewed from a certain viewpoint as the first image P1. Specifically, at Step S21, an image of a commercial building is projected from the projector 34. The cursor C is superimposed on the first image P1. Further, the mobile electronic device 1 controls the display unit 32 to display the information previously related to the commercial building indicated by the cursor C in the first image P1. Specifically, the mobile electronic device 1 controls the display unit 32 to display a list of tenants occupying the commercial building indicated by the cursor C.

Here, it is assumed that the mobile electronic device 1 is rotated by the user counterclockwise by an angle R3. When the variation of the attitude of its own device is detected, the mobile electronic device 1 changes the image projected as the first image P1, to an image viewed from the viewpoint whose direction is varied in association with the direction and the amount of the detected attitude variation, as at Step S22. The variation of the image at this time is similar to the variation of a scene when a person changes a direction of his/her viewpoint while standing a certain point.

As a result of the change of the viewpoint, at Step S22, an image of an entrance of a subway station is projected as the first image P1, and the cursor C indicates the entrance of the subway station. Accordingly, the mobile electronic device 1 controls the display unit 32 to display the information related to the subway station indicated by the cursor C as the second image P2. Specifically, the mobile electronic device 1 controls the display unit 32 to display a time table of the subway station indicated by the cursor C.

In this way, while projecting the image of the district, the mobile electronic device 1 displays the information regarding specific building and facility in the district. This allows the user to watch the information regarding the specific building and facility on the display 2 with high resolution while browsing an expanded actual scene of the district. Further, the mobile electronic device 1 changes the direction of the viewpoint in association with the variation direction and the variation amount of the attitude of the mobile electronic device 1, and changes the display content of the information regarding the building and the like in association with the variation of the direction of the viewpoint. This allows the user to acquire the information of the district in a feeling as if the user is standing there, by the intuitive operation of changing the attitude of the mobile electronic device 1.

The mobile electronic device 1 may detect a variation of its position and move a position of the cursor C in association with the variation of its position, when the position of the mobile electronic device 1 is changed by the user. In this case, for example, the position of the cursor C is moved to the right when the position of the mobile electronic device 1 is moved to the right by the user.

The position of the viewpoint may be varied in association with the variation of the position of the mobile electronic device 1. For example, the viewpoint may be advanced frontward when the mobile electronic device 1 is moved to a position closer to the image projection target, and may be retreated backward when the mobile electronic device 1 is moved to a position far from the image projection target. Thus, by moving the viewpoint to the variation position of the mobile electronic device 1, the user can acquire the information of the district in a feeling as if the user is actually walking through the district, by the intuitive operation.

Subsequently, FIG. 12 will be described. FIG. 10 illustrates an example where the projection range is scrolled horizontally in association with the variation of the attitude of the mobile electronic device 1. Meanwhile, FIG. 12 illustrates an example where the projection range is scrolled vertically in association with the attitude of the mobile electronic device 1.

At Step S31 illustrated in FIG. 12, the mobile electronic device 1 controls the projector 34 to project a head portion of a WEB page as the first image P1. Further, the mobile electronic device 1 controls the display unit 32 to display an entire body of the WEB page as the second image P2 related to the first image P1.

Here, it is assumed that the user rotates the mobile electronic device 1 downward by an angle R4. When variation of the attitude of its own device is detected, the mobile electronic device 1 scrolls the WEB page downward, which is displayed as the first image P1, in association with the direction and the variation amount of the detected attitude variation, as at Step S32. As a result, at Step S32, a lower portion of the WEB page is projected.

Thus, mobile electronic device 1 scrolls a projected portion in the vertical direction in association with the variation of the attitude of the mobile electronic device 1. In the example illustrated in FIG. 12, the content displayed on the display unit 32 is not changed between at Step S31 and step S32, however, mobile electronic device 1 may indicate the projected portion on the display unit 32 by drawing a frame around the portion, etc.

The aspects of the present invention explained in the aforementioned embodiment can be arbitrarily changed in a range not departing from the spirit of the present invention. For example, the projector 34 may project the image from a surface other than an opposite side of the display 2. In the embodiment, a still image is projected from the projector 34 and the still image is displayed on the display 2. However, either one or both of the aforementioned still images may be a moving image.

The advantages are that one embodiment of the invention provides a mobile electronic device that allows the user to utilize a projected image and information related to the image.

What is claimed is:

1. A mobile electronic device, comprising:
   a projector for projecting a first image;
   a display unit for displaying a second image, the second image being an image related to the first image;
   a detector for detecting a variation of an attitude; and
   a processing unit for applying, when the variation of the attitude is detected by the detector, a variation to the first image in association with the variation of the attitude, and for varying the second image in association with the variation of the first image after applying the variation to the first image.

2. The mobile electronic device according to claim 1, wherein
   the processing unit is configured to control the projector to project the first image of a fixed size in a fixed range of a projection target.

3. The mobile electronic device according to claim 1, wherein
   the projector has a projectable range allowing the first image of a fixed size to be projected in a fixed range of a projection target even if there is the variation of the attitude, and
   the processing unit is configured to convert a ratio of an amount of the variation of the attitude detected by the detector with respect to the projectable range, to an amount of the variation of the first image.

4. The mobile electronic device according to claim 1, wherein
   the processing unit is configured to scroll the first image in association with the variation of the attitude, when the variation of the attitude is detected by the detector.

5. The mobile electronic device according to claim 1, wherein
the processing unit is configured to rotate an object in the first image in association with the variation of the attitude, when the variation of the attitude is detected by the detector.

6. The mobile electronic device according to claim 1, wherein
the processing unit is configured to change a viewpoint of the first image in association with the variation of the attitude, when the variation of the attitude is detected by the detector.

7. The mobile electronic device according to claim 1, wherein
the processing unit is configured to control the projector to project the first image, using a portion of first image data for forming the first image.

8. The mobile electronic device according to claim 1, wherein
the processing unit is configured to
vary the first image in a first manner in association with the variation of the attitude and
vary the second image in a second manner in association with the variation of the first image.

9. The mobile electronic device according to claim 1, wherein
the processing unit is configured to control the display unit to indicate a projected portion of the first image on the display unit, with a frame drawn around the portion.

10. The mobile electronic device according to claim 1, wherein
the projector is configured to project the first image from a surface other than an opposite side of the display unit.

11. A mobile electronic device, comprising:
a projector for projecting a first image;
a display unit for displaying a second image, the second image being an image related to the first image and having content different from content of the first image;
a detector for detecting a variation of an attitude; and
a processing unit for applying, when the variation of the attitude is detected by the detector, a variation to the first image in association with the variation of the attitude, and for varying the second image in association with the variation of the first image,
wherein the processing unit for applying, when the variation of the attitude is detected by the detector, the variation to the first image in association with the variation of the attitude, and for varying the second image in association with the variation of the first image after applying the variation to the first image.

12. The mobile electronic device according to claim 11, wherein
the processing unit is configured to control the projector to project the first image of a fixed size in a fixed range of a projection target.

13. The mobile electronic device according to claim 11, wherein
the projector has a projectable range allowing the first image of a fixed size to be projected in a fixed range of a projection target even if there is the variation of the attitude, and
the processing unit is configured to convert a ratio of an amount of the variation of the attitude detected by the detector with respect to the projectable range, to an amount of the variation of the first image.

14. The mobile electronic device according to claim 11, wherein
the processing unit is configured to scroll the first image in association with the variation of the attitude, when the variation of the attitude is detected by the detector.

15. The mobile electronic device according to claim 11, wherein
the processing unit is configured to rotate an object in the first image in association with the variation of the attitude, when the variation of the attitude is detected by the detector.

16. The mobile electronic device according to claim 11, wherein
the processing unit is configured to change a viewpoint of the first image in association with the variation of the attitude, when the variation of the attitude is detected by the detector.

17. The mobile electronic device according to claim 11, wherein
the processing unit is configured to control the projector to project the first image, using a portion of first image data for forming the first image.

18. The mobile electronic device according to claim 11, wherein
the processing unit is configured to
vary the first image in a first manner in association with the variation of the attitude and
vary the second image in a second manner in association with the variation of the first image.

19. The mobile electronic device according to claim 11, wherein
the processing unit is configured to control the display unit to indicate a projected portion of the first image on the display unit, with a frame drawn around the portion.

* * * * *